March 29, 1960
R. L. BROWN ET AL
2,930,090
FASTENER
Filed Aug. 1, 1956
2 Sheets-Sheet 2
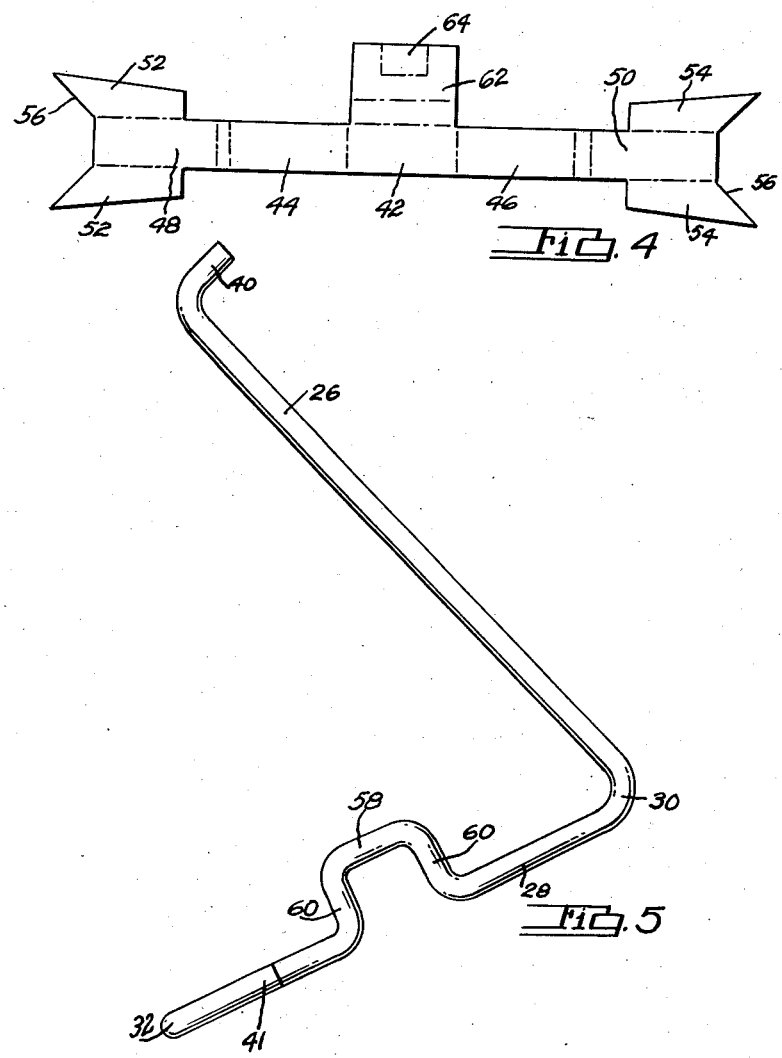
INVENTOR.
ROBERT L. BROWN AND
EDWIN F. ELMS
BY
ATTORNEY

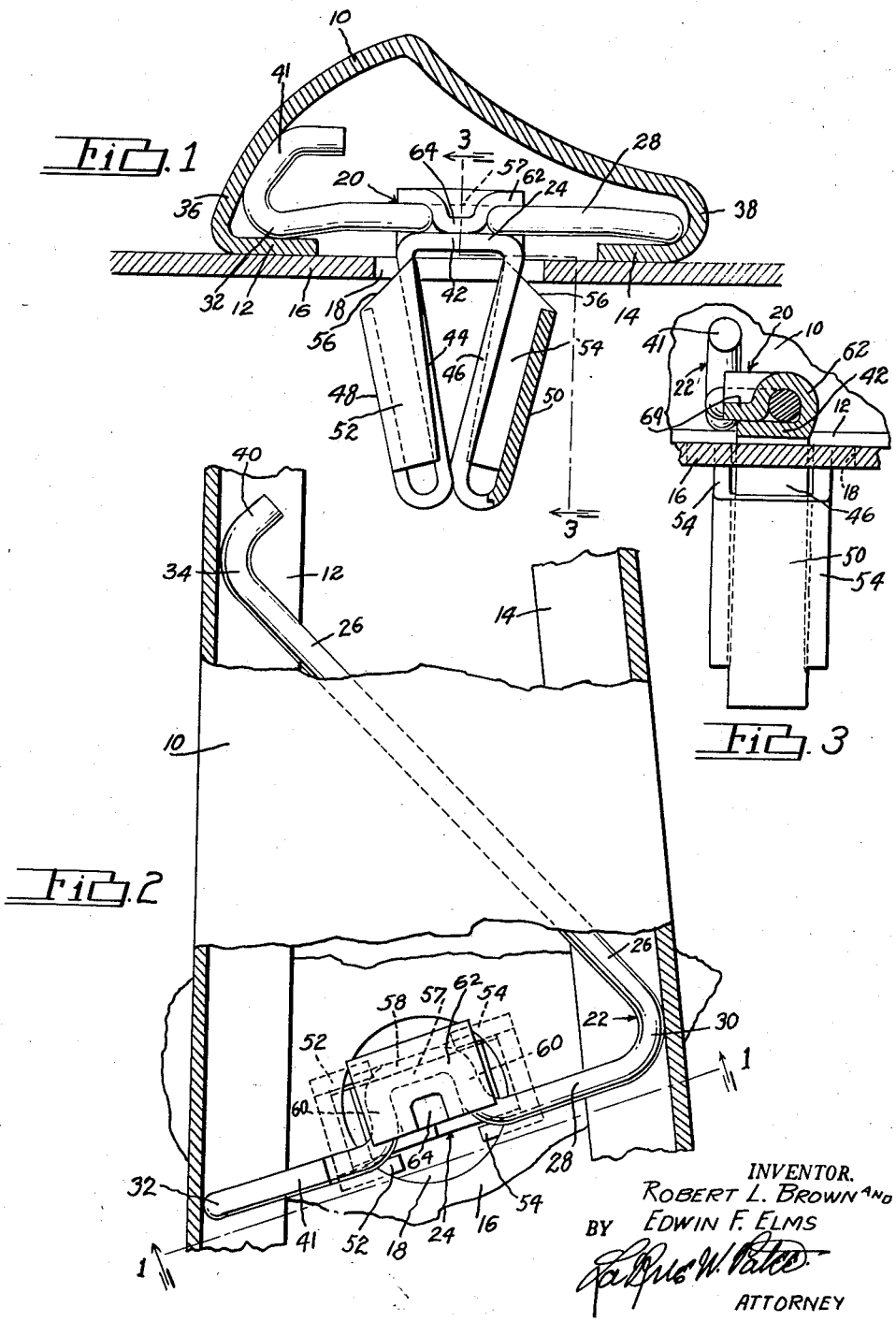

2,930,090

FASTENER

Robert L. Brown, Ferndale, and Edwin F. Elms, Roseville, Mich.

Application August 1, 1956, Serial No. 601,549

3 Claims. (Cl. 24—73)

This invention relates to fastening devices for securing a part to a panel, particularly a hollow, channel shaped molding provided with inturned flanges to be secured to an apertured panel.

A specific illustration is that of securing channel shaped bead trim of the tapered type now widely used in decoration and finishing of automobile bodies.

It is an object of the present invention to provide a fastener which may be easily positioned in the trim member and which shall maintain an expanding yielding engagement therewith to accommodate itself to the variations in width of a tapered trim member.

Another object of the invention is to provide a two part fastener in which the apertured panel engaging portion is firmly held against sliding or turning relative to the trim engaging portion.

The above and other objects will become more apparent from the following description taken in connection with the accompanying drawings illustrating a preferred embodiment of the invention.

Fig. 1 is a cross sectional view through a trim member applied to a panel, showing the fastener in side elevation and partly broken away; as viewed on line 1—1 of Fig. 2;

Fig. 2 is a top plan view of the fastener shown in Fig. 1 with the trim member broken away and in section;

Fig. 3 is a side elevational view of the fastener taken at right angles to Fig. 1 on line 3—3 of Fig. 1;

Fig. 4 is a top plan view of the blank from which the sheet metal member is formed; the dot and dash lines indicating the fold lines; and Fig. 5 is a top plan view of the wire portion to which the folded sheet metal member is applied.

Trim for various uses such as beading for interior decoration, for metal furniture, and for use in trim for automobile bodies, is required to be firmly held in position, and such trim takes various forms, but essentially it comprises a channel strip having a partially opened side or slot at which terminate inturned flanges forming the edges of the strip, and such channel strips are often tapered, having variations in width throughout their length.

In the drawings, a trim strip, tapered longitudinally, is illustrated at 10 having inturned flanges 12 and 14. The outer surfaces of the flanges 12 and 14 are adapted to bear against the outer surface of a supporting panel 16 provided with longitudinally spaced apertures, only one of which is shown at 18.

The fastener, generally indicated at 20, is preferably formed of two parts, one part 22 being a resilient wire bent to desired shape for contact engagement with the trim material flanges, and the other part being a sheet metal U-shaped member 24 securely attached to the wire member 22 for insertion into the aperture 18.

The wire part 22 is formed having a pair of arms 26 and 28 extending diagonally across the flanges 12 and 14. The connecting portion 30 between the arms 26 and 28 forms a hold down portion for the inturned flange 14, and the outer free ends 32 and 34 of the arms form a hold down portion for the opposite inturned flange 12. The arms 26 and 28 are initially formed at a predetermined angle to each other, but may be resiliently urged to a greater degree of angle by bending at the connecting portion 30, whereby the transverse dimension between arms 26, 28, and connecting portion 30 is decreased thus accommodating the hold down portions to a lesser width of molding or trim material. The resiliency of the wire causes the free ends 32 and 34 of the arms and the connecting portion 30 to be urged into frictional engagement with the inner surface of the side walls 36 and 38 of the trim member, thereby retaining the fasteners in proper longitudinal spaced relation preparatory to installation of the trim to the support and which may be manually adjusted longitudinally in the trim strip, if desired. The outer free end of the arm 26 is curved or bent to provide an inwardly extending portion 40 to provide a curved surface for contact engagement with the interior of the trim strip. The outer free end of the arm 28 is curved or bent upwardly at 41 and inwardly for the same purpose and to contact a portion of the inner surface of the trim strip.

One of the arms of the wire part 22, here shown as the arm 28, is provided with the sheet metal panel engaging member 24 which is securely locked to the arm. This sheet metal panel engaging member 24 comprises a head portion 42 having depending legs 44 and 46 integral therewith. The legs 44 and 46 of the sheet metal member are reversely bent upwardly and outwardly forming resilient members 48 and 50 which are normally spaced from the legs 44 and 46 but which may be sprung inwardly toward the legs. The resilient members 48 and 50 each have their marginal or lateral edges inwardly turned to form wings 52 and 54 thereon. The upper edges of the wings 52 and 54 are cam shaped, converging upwardly and inwardly, as at 56, from the upper free end of the resilient members 48 and 50 toward the head portion 42, at opposite edges of the legs 44 and 46. The lower ends of the resilient members 48 and 50 and legs 44 and 46, at the bend, are of such dimensions as to freely enter the aperture 18 and as the fastener is inserted therethrough the resilient members 48 and 50 and wings 52 and 54 are urged toward each other until the upper free ends of the resilient members 48 and 50 pass the aperture 18. When the fastener reaches its innermost position, as when the inturned flanges 12 and 14 bear against the panel 16, the resilient members 48 and 50, due to their spring tension, spring outwardly so that the convergent edges 56 of the wings engage the under surface of the aperture 18 and draw the trim strip tightly against the panel in fixed position.

The arm 28, of the wire part 22, at its mid portion, is provided with a U-shaped bent portion 57, extending in a horizontal plane with the arms 26 and 28. This bent U-shaped portion is provided with a base portion 58 and spaced side portions 60 forming a means for positioning the panel engaging member 24. The head portion 42 lies in contact with the under surface of the base 58 and side portion 60 of the U-shaped bent portion. At one edge of the head portion 42 is an integral reversely bent flange 62 which overlies the U-shaped bend in the wire arm 28. A depressed portion 64 formed in the flange 62 engaging the inner surface of the base portion 58 and the inner surfaces of the side portions 60, securely locks the panel engaging portion to the hold down portion, preventing shifting or turning movement of one with respect to the other.

It will be apparent from the foregoing description that the invention contemplates a fastener of simple and practical construction, one which may be used in trim strips of various width or tapered longitudinally, and one in which a single wire part of resilient material is securely locked to a sheet metal stamping of the snap on type which secures the fastener to a panel.

Formal changes may be made in the specific embodi-

We claim:

1. A fastener for use with a channel-shaped member as for example a molding strip having inturned flanges along its opposite edges comprising a resilient wire member having connected arms adapted to resiliently engage within the channel-shaped member adjacent and between the inturned flanges, one of said arms having a U-shaped bend in the plane thereof and a sheet metal spring clip member having a base positioned against one face of the U-shaped bend, said base having a tab thereon bent around said U-shaped bend and engaging the opposite face of the U-shaped bend, said tab having a depressed portion engaged within the U-shaped bend to rigidly secure the wire and sheet metal members together and thereby prevent relative movement therebetween.

2. A fastener as called for in claim 1 wherein said spring clip member has a pair of spring legs extending from said base generally perpendicular to the plane of said connected spring arms.

3. A fastener comprising a resilient wire member having a pair of spring arms diverging from a point of innerconnection between the arms, one of said arms having intermediate its ends a U-shaped bend therein lying in the plane of said pair of arms, a sheet metal spring clip member having a base seated against one face of the U-shaped bend and having a tab thereon bent around the bight portion of the U-shaped bend and engaging the opposite face of the U-shaped bend, said tab having a depressed portion extending between the legs of the U-shaped bend to rigidly secure the wire and sheet metal members together and thereby prevent relative movement therebetween.

References Cited in the file of this patent

UNITED STATES PATENTS

| | | |
|---|---|---|
| 1,737,375 | King | Nov. 26, 1929 |
| 1,992,093 | Place | Feb. 19, 1935 |
| 2,178,719 | Cotter | Nov. 7, 1939 |
| 2,188,026 | Wiley | Jan. 23, 1940 |
| 2,221,009 | Van Uum | Nov. 12, 1940 |
| 2,229,802 | Dyresen | Jan. 28, 1941 |
| 2,254,310 | Place | Sept. 2, 1941 |
| 2,540,396 | Krach | Feb. 6, 1951 |
| 2,596,596 | Poupitch | May 13, 1952 |
| 2,677,862 | Flora | May 11, 1954 |
| 2,820,270 | Scott | Jan. 21, 1958 |

FOREIGN PATENTS

| | | |
|---|---|---|
| 1,015,245 | France | July 2, 1952 |